Figure 1:
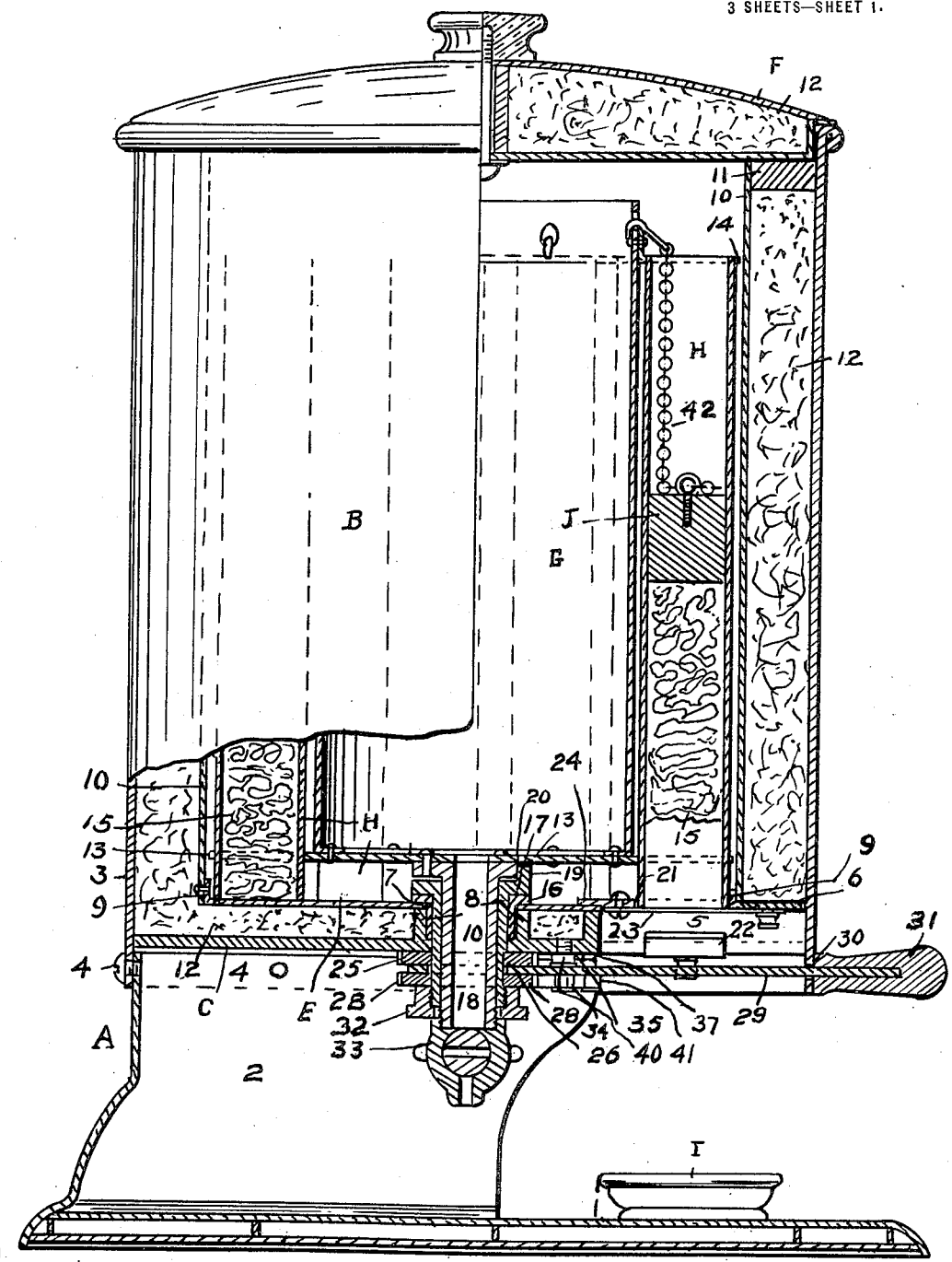

J. F. WINELAND.
PORTIONING MECHANISM.
APPLICATION FILED NOV. 25, 1919.

1,395,978.

Patented Nov. 1, 1921.
3 SHEETS—SHEET 1.

J. F. WINELAND.
PORTIONING MECHANISM.
APPLICATION FILED NOV. 25, 1919.
1,395,978.
Patented Nov. 1, 1921.
3 SHEETS—SHEET 2.
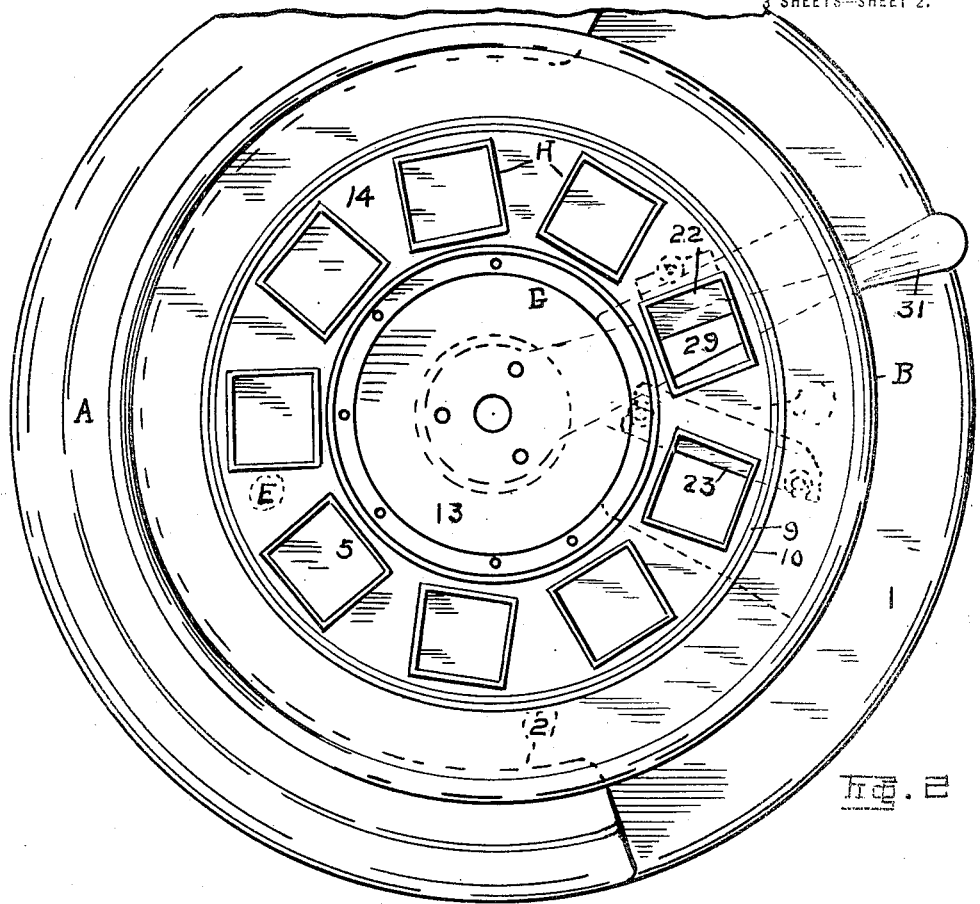
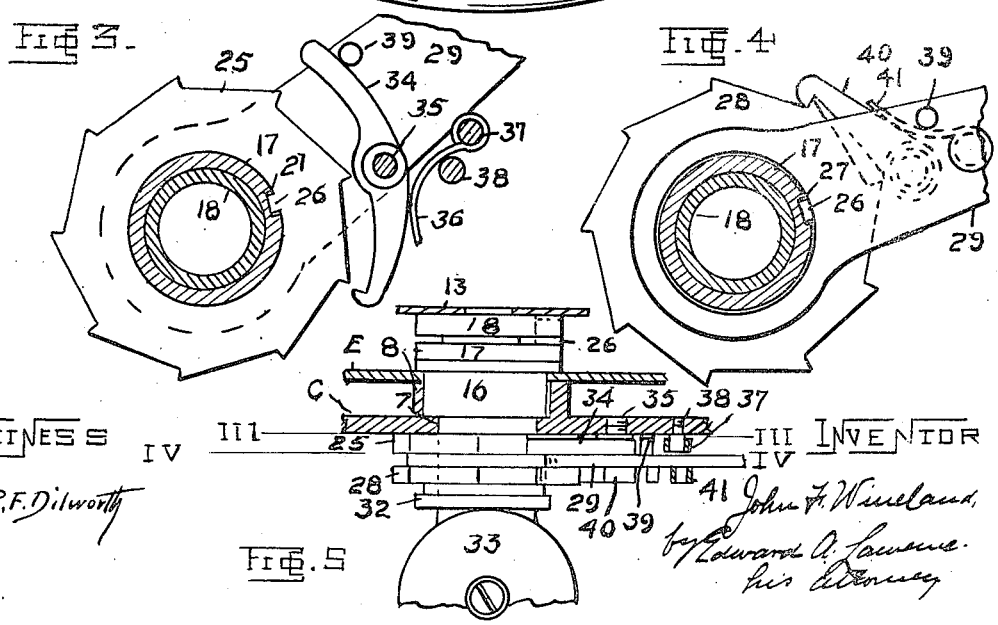

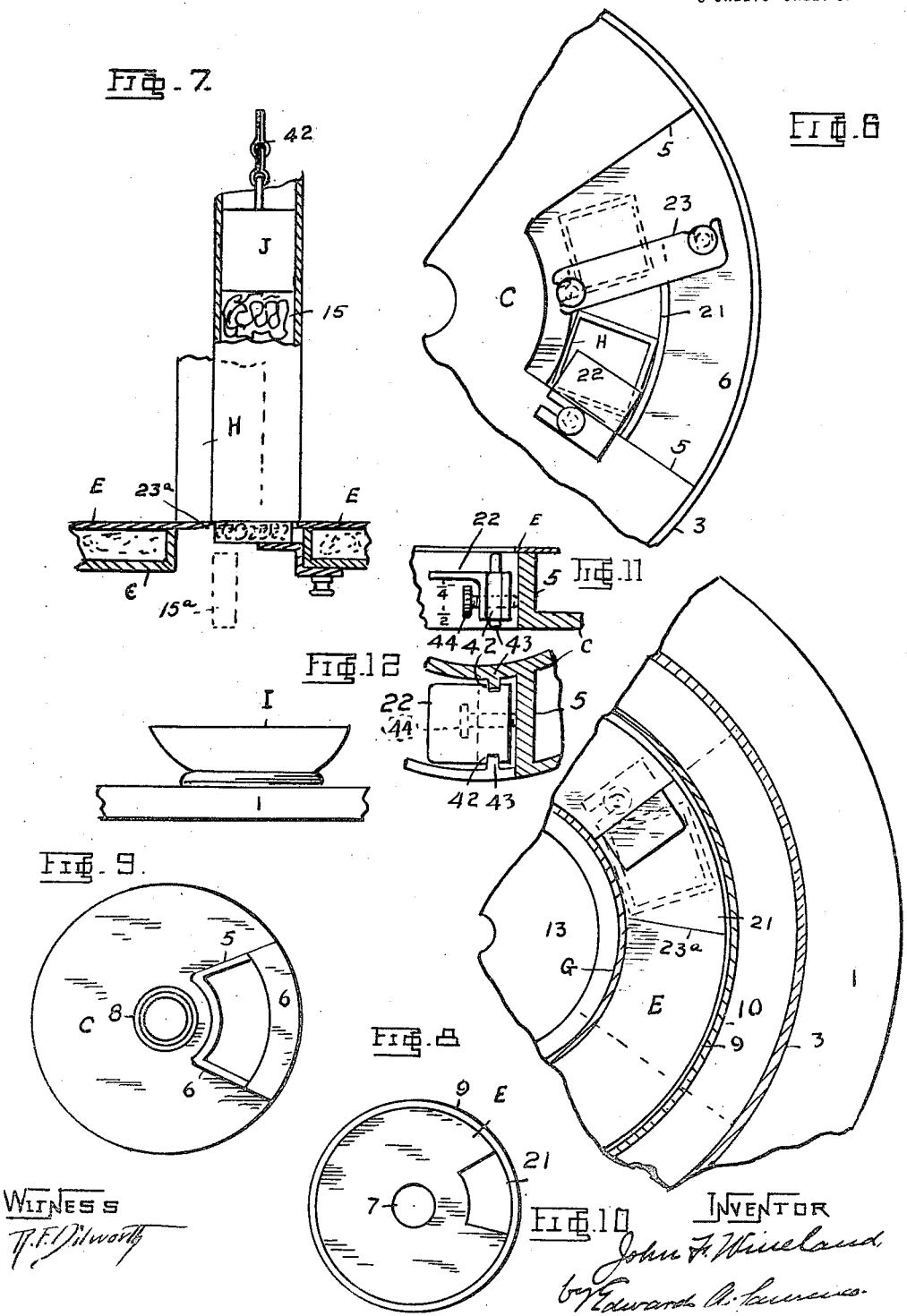

UNITED STATES PATENT OFFICE.

JOHN F. WINELAND, OF CRAFTON, PENNSYLVANIA.

PORTIONING MECHANISM.

1,395,978.   Specification of Letters Patent.   Patented Nov. 1, 1921.

Application filed November 25, 1919. Serial No. 340,560.

*To all whom it may concern:*

Be it known that I, JOHN F. WINELAND, a citizen of the United States, and residing in the borough of Crafton, county of Allegheny, and State of Pennsylvania, have invented or discovered new and useful Improvements in Portioning Mechanism, of which the following is a specification.

My invention consists in a new and improved portioning machine for dispensing butter and other substances.

Generally speaking, it comprises one or more dispensing containers or tubes provided with openings for the discharge of their contents either by gravity or other influence, said openings being normally sealed, to hold the contents retracted, by a surface along which the containers travel, said surface being provided with an interruption or aperture, which, when the discharge opening of a container registers therewith, permits the protrusion of the contents thereof; and cutting means actuated by the further travel of the container which slices off the protruding part of the contents of said container to form a portion which is discharged from the machine while the container moves once more into sealing contact with said surface.

Means are provided for limiting the protrusion of the butter or other product when the container registers with the aperture in the sealing surface, thus determining the thickness of the portion to be sliced, and such means may be adjustable so that the quantity served as a portion may be varied, as desired.

The severing or slicing means may be a fixed knife extending transversely across the aperture in the path of the container, so that as the container moves out of registration with the supporting and limiting means, said knife is caused to slice through the protruding butter, or, if desired the edge of the surface forming the rear end of the aperture may be sharpened to form the cutting edge.

In the preferred form of my invention, illustrated in the drawings, a plurality of vertically disposed dispensing tubes are mounted concentrically on a rotary frame which may be conveniently in the form of an ice or other refrigerant tank, for keeping the contents of the tubes properly chilled.

Each tube is adapted to contain a slab of butter or other substance to be portioned, the lower end of the tube forming its discharge opening, and said discharge openings being normally sealed by the contact of the lower ends of the tubes with a smooth surface over which said ends travel and which seals the tubes against the downward protrusion of the butter slabs therefrom. To insure the proper sealing and to prevent wear from rendering the same ineffective, I prefer to support the frame by the contact of the tubes with said sealing surface, rotary motion being applied axially to the frame. At one point in the path of said tubes said surface is provided with an aperture or interruption, which results in the slab protruding downwardly from its tube when the lower end of said tube registers with said aperture, the protrusion of the slab being limited by a spacing shelf extending beneath the aperture, with which the descending slab contacts to limit its movement. The far end of the aperture is provided with fixed cutting means, which may be either a knife blade or simply the sharply beveled edge of the sealing surface, so that when the tube next moves, as the protruding end of its slab passes off the spacing shelf it comes into contact with the fixed cutting means, which means is thus caused to slice through the protruding butt of the slab, thus severing a portion which drops down onto a waiting butter plate, while the slab, now sliced off even with the lower end of said tube, is again supported and held retracted by the sealing surface as the tube resumes sliding contact therewith.

Thus by the intermittent rotation of the tube support, to form portions as need requires, the slab of each tube in turn is caused to descend and protrude below the tube by the registration of the tube with the portioning aperture, and upon the next movement of the support, said protrusion is sliced off by the cutting edge at the rear end of the aperture, the portion dropping down onto the waiting butter plate, while the tube again resumes sealing contact with the surface, its slab being thus held retracted until the tube again in turn registers with the aperture.

Means are provided whereby, as individual portions are required, as for instance for patrons in a restaurant, the necessary rotary motion is imparted to the tube support to slice off a portion of butter; means are also provided for halting the movement at the proper moment to insure accurate operation, and means are also provided whereby a cutting movement must be completed and a portion severed, before another actuating motion can be imparted to the machine.

Other novel features of construction and arrangement of parts will appear from the following description.

In the accompanying drawings, which are merely intended to illustrate the principles of my invention without limiting the scope of the same to the construction shown, Figure 1 is a side elevation of a portioning machine embodying the principles of my invention, the structure being partially broken away in section to more clearly show the parts; Fig. 2 is a top plan view of the same with the lid removed; Fig. 3 is an enlarged view of the mechanism for locking the tube support against excess forward movement, the same being in section along the line III—III in Fig. 5; and the lever being indicated at the end of its reverse movement; Fig. 4 is a similar view along the line IV—IV in Fig. 5, showing the mechanism for moving the tube support, the lever being indicated at the end of its forward or cutting movement; Fig. 5 is a detail, partially in vertical section showing the mounting of the rotary support and the pawl and gear mechanism through which the necessary movement is imparted to said support; Fig. 6 is a broken inverted plan view of the casing floor, as shown in Fig. 1; Fig. 7 is a detail in vertical section showing a tube in registration with the portioning aperture with its slab protruding and supported by the spacing shelf and the previously severed portion dislodged by the protruding slab and falling onto a waiting butter plate, the slicing means being shown as formed by the edge of the sealing surface; Fig. 8 is a broken horizontal section through the main casing and the rotary support; the cutting means, however, being in this case shown as the rear end of the aperture in the sealing surface; Fig. 9 is a plan view of the casing head; Fig. 10 is a similar view of the casing floor; and Figs. 11 and 12 are, respectively, vertical and horizontal sections showing an adjustable spacing shelf.

The following is a detailed description of the drawings.

A is the base having a bottom 1 and a semi-circular vertical wall 2, which wall is preferably omitted at the front of the machine to permit the insertion of butter plates to catch the portions as the same are severed.

B is the main casing having a circular outer wall 3 which is shown as telescoping down over the wall 2 and secured thereto by screws 4. If desired, the base and casing may be made integral, but I prefer to make them separate and detachably connected together so that the machine can be readily cleansed and repaired.

C is a head fixed in the lower portion of the casing B, said head being circular except for a quadrantal recess in the front portion thereof, the walls of said recess being defined by an upwardly extending edge flange 5. 6 is an integral bridge which spans the mouth of said recess, said bridge being superimposed on the flange 5, and thus completing the perimeter of said head at a higher elevation than the body of said head. The head C is further provided with a circular hole 7 at its center surrounded by an upwardly extending annular collar 8, stepped back from said opening and of the same height as the flange 5.

E is a circular floor plate mounted on and preferably soldered to the flange 5 and the collar 8, and provided with a perimetral upwardly turned flange 9. 10 is the circular inner wall of the casing B, secured at its top to the top of the outer wall 3 by means of an interposed annular head 11 and having its bottom edge secured to the outer face of the flange 9 of the floor E. At the front the flanged edge of said floor is in contact with the inner curved edge of the bridge 6, and may be soldered thereto. The space between the head C and the floor E and between the walls 3 and 10 may be filled with cork 12, or some other suitable heat insulating material.

F is a removable lid for the casing B, provided with a central portion which fits down into the top of the inner wall 10. Said lid is also provided with an interlining of insulating material.

G is a rotary support upon which the vertically disposed dispensing tubes H are mounted. I prefer to use for this support a tank in which may be placed a supply of refrigerant for keeping the slabs of butter, or other substance contained in the tubes, in proper condition for dispensing. The tubes may be of any desired number. I have shown, for the sake of illustration, nine tubes equally spaced around the tank. As a convenient manner of mounting the tubes, I form the bottom of the tank of a head 13 of greater diameter than the tank and having a rotary fit within the wall 10 of the casing B. The protruding portion of said head is provided with apertures through which the lower ends of said tubes depend into contact with the floor E. The upper ends of said tubes may be secured in suitable apertures in an annular head 14 secured circumferentially of the tank G. The tubes may be soldered or otherwise secured in place. The tubes are open at their ends and are adapted to contain slabs 15 of butter or other substance to be dispensed. I have shown the cross sectional shape of said tubes as square but any desired shape which will allow of the free downward movement of the slabs may be adopted.

The lower, discharge ends of said tubes are squared off to maintain close, sliding contact with the floor E which is polished nickel or otherwise provided with a smooth surface so that as the ends of said tubes travel along said floor, said floor will seal the lower ends of said tubes against the downward protrusion of the slabs, the butter thus being supported in the tubes by the floor. The floor plate may advantageously be made of solid nickel with its surface highly polished.

To prevent an impairment of such sealing action by the wear on the tubes or floor, I support the tank on the tubes, imparting the rotary movement to the tank and tubes at the axis of the tank from below in the following manner. Thus the ends of the tubes are always maintained in close contact with the floor.

16 is a bushing having an enlarged head which depends through the axial hole in the floor E and fits in the collar 8, the bore of the bushing forming an upward continuation of the hole 7 in the head C. 17 is a second bushing suspended in the bushing 16 and hole 7 by its enlarged head and having its lower protruding end threaded. The bushing 17 is thus journaled in a vertical bearing.

18 is a cylindrical spindle secured axially to the bottom of the tank G and depending through the bushing 17. The bottom of said tank is provided with a hole registering with the bore of spindle 18 for draining the tank through said spindle. The lower protruding end of the said spindle 18 is threaded.

The spindle 18 is made to rotate with the bushing 17 by means of a radial key 19 on the head of the bushing engaging a radial slot 20 in the head of the spindle.

At the front of the machine the floor E is apertured above the quadrantal recess in the head C, in the track of the tubes H. Said aperture is marked 21. Thus in turn the lower, discharge end of each of the tubes is brought into registration with said recess 21, thus removing the support for the lower ends of the slabs 15 and permitting them in turn to drop down in said tubes. To limit the protrusion of the slabs from the tubes, I provide a spacing shelf 22 secured to the under side of the head C and extending under the aperture 21, so that as a tube is moved into registration with said aperture and its slab drops, the butt end of said slab engages said shelf and the protrusion of said slab is thus limited. At the other or rear end of the aperture is a fixed knife 23 removably mounted on the under side of the bridge 6 and on a struck up bracket 24 on the floor C. The top surface of said knife is on a level with the top surface of the floor E. Thus as the tube which has moved into registry with the aperture 21 again moves, the protruding butt of its slab, as it leaves the shaft 22 is sliced through by the knife 23, the severed portion dropping down onto the waiting butter plate I, while the shortened slab is supported by the knife in the tube until said tube reassumes contact with the floor E which then again seals the tube and supports the slab therein until the tube once more registers with the aperture 21, when the protrusion and slicing off of the butt of the slab is repeated. It is evident that the elevation of the shelf 22 will determine the thickness of the portion severed from the slab, and I therefore prefer to provide several shelves with a machine so that any desired thickness of portion may be adopted by installing the proper shelf.

The aperture 21 is of the proper extent to allow for the dropping of the slab when a tube moves into registration with the aperture without interference with the knife, but as the slab begins to move off the shelf during the next movement of the tubes, it comes into contact with the knife or cutting edge, as shown in Fig. 7.

In case the sliced off portion should tend to stick, the descent of the slab in the next succeeding tube will knock the portion loose and cause it to fall into the butter plate I, as indicated in dotted lines at 15ª in Fig. 7.

In Figs. 7 and 8, I have shown the floor E provided with a knife edge 23ª which takes the place of a separate knife. To provide sufficient clearance for the butt of the slab, while being severed, I make the aperture 21 in the floor E of less length than the width of the quadrantal recess in the head C, as shown in Figs. 6 and 7.

It is thus evident that by means of intermittent rotary movements of the tank and tubes, shown as clockwise in the machine illustrated in the drawings, the tubes will in turn register with the aperture in the sealing floor, causing the butts of their butter slabs to protrude, and upon the next movement said protruding butts will be sliced off, while the shortened slabs will again be supported in the tubes by the passing once more of the lower ends of the tubes into sealing contact with the floor E. The movement in each case is equal to the distance between centers of adjacent tubes.

As a convenient means for enabling the operator to move the tubes clockwise intermittently, I provide the following mechanism.

25 is a ratchet gear mounted on the bushing 17 against the under side of the head C, and rotating in unison with said bushing owing to the engagement of its fixed key 26 with the longitudinal groove 27 in the bushing. The teeth of gear 25 face clockwise.

28 is a second ratchet gear similarly mounted and keyed on bushing 17, but with teeth facing counterclockwise. 29 is a lever having an annular hub rotatably mounted on the bushing 17 between said gears, which lever extends radially through a horizontally extended slot 30 in the wall of casing B and is provided at its outer end with a grasping handle 31.

32 is a nut screwed on the lower end of bushing 17 to hold the gears and the lever in place, and 33 is a stop cock screwed onto the lower end of the spindle 18 to control the escape of liquid from the tank G, and also serving to hold the spindle in proper position in the bushing, thus steadying the movement of the tank and tubes. The teeth of the two ratchet gears are equal in number and also equal to the number of the tubes H.

34 is a pawl pivotally mounted intermediate of its ends on a post 35 depending from the head C and held in resilient engagement with the perimeter of the gear 25 by means of a spring 36 mounted on a stud 37 depending from said head, and held in place by a second stud 38 also depending from the head C. It is evident that when said pawl engages a tooth of the gear 25, the tubes H are locked against clockwise movement.

39 is a pin extending upwardly from the lever 29 and contacting with the tail of pawl 34, the pawl being so curved that as the lever reaches the end of its counterclockwise swing, after completing an actuating or clockwise movement, the pawl is moved out of contact with the gear 25, thus unlocking the tubes for the next forward or clockwise movement.

40 is a pawl pivoted to the under side of the lever 29 and held against the perimeter of the gear 28 by a spring 41. Thus when the pawl 40 engages one of the teeth of said gear, a clockwise movement of the lever 29 will result in a similar movement of the tubes H for a distance equal to the distance between the centers of adjacent tubes, the movement being terminated when the pawl 34 drops into engagement with a tooth of the gear 25.

The return of the lever in a counterclockwise direction is unobstructed, the pawl 40 trailing along the perimeter of the gear 28 until it drops into engagement with the next tooth, ready to rotate the tubes H upon the next clockwise movement of the lever.

The various portions of the machine are so proportioned and assembled that at each clockwise movement of the lever, a tube is brought into registration with the spacing shelf, causing its slab to protrude, and upon the next clockwise movement of the lever the protruding butt of the slab is sliced off, the portion thus formed dropping down upon the waiting butter plate I, while the slab, which has been sliced off even with the end of the tube, passes on, once more held retracted in the tube by contact with the floor E. It is evident that no excess forward movement of the tubes is possible owing to the action of the locking pawl 34, so that the tubes are at all times accurately spotted. It is also evident that when a forward movement is once begun, the same must be finished before a second forward movement can be started owing to the fact that until the forward movement is completed, a reverse movement of the lever would not set the machine for a second forward movement, as the necessary gear tooth would not have been turned as yet into position to be engaged by the pawl 40. Thus no clogging of the machine is possible through carelessness.

Should the severed portion cling depending from the knife edge, the butt of the slab, in the next succeeding tube, as it drops down on the spacing shelf will knock the portion loose. Thus the delivery of the severed portion is assured.

To assist gravity in causing the slabs to drop as the tubes in turn register with the spacing shelf, I prefer to provide weights J of proper shape to ride on top of the slabs 15 in the tubes H. These weights are anchored by chains 42 to the tank G to prevent their dropping down through the ends of the tubes.

If the tank G is provided with the proper amount of refrigerant, the slabs 15 will be kept in condition to slide freely in the tubes H.

The tubes H may be refilled when partly or entirely empty, the weights J being first lifted out. If the tubes are all filled at the same time, all will be emptied during the last complete rotation of the tank, and thus all will be ready for refilling at one time.

Although in the embodiment of my invention illustrated in the drawings, a gravity feed is used for dispensing the slabs, it is evident that any character of pressure or force for protruding the slabs at the proper moments from their containers may be used without departing from the scope of my invention. In such case, of course, the dispensing tubes or other containers need not be vertically or downwardly disposed as where gravity feed is used. However, I prefer the gravity feed owing to the fact that no unnatural compression or squeezing of the butter results. This avoids loss in weight and volume, a serious objection to the use of other power than gravity for delivering the butter from its container. I have shown the dispensing containers as open ended tubes of constant cross-sectional shape, but, it will be understood that where other means than gravity is used to cause the protrusion of the substance from the container, the shape of the container may be varied.

In Figs. 11 and 12 I show the spacing shelf 22 made adjustable, so that the thickness of the portions sliced may be regulated, as desired. Thus the shelf is provided with opposed vertical slots 42 which engage the slideways or guides 43 mounted on the head C. 44 is a thumb bolt extending through a threaded hole in the shelf member and adapted to be screwed against the adjacent portion of the flange 5 of the head C to lock the shelf stationary at any desired elevation.

The action of my machine is rapid and positive. It is entirely sanitary, as the human hand does not come into contact with the individual portion. Furthermore, the portions are accurately measured, and are therefore uniform in size, thus avoiding waste.

Although, for the sake of clearness, I have described in detail the embodiment of the principles of my invention shown in the drawings, I do not wish to limit myself thereby, but claim broadly:

1. In a portioning machine, the combination of a dispensing container adapted to contain a quantity of the substance to be portioned and provided with a discharge opening, a surface adapted to seal said discharge opening against the protrusion of said substance, said surface being interrupted, means for providing relative movement between said container and said surface, means whereby when said surface is out of contact with said opening the contents of said container will be protruded from said container beyond the plane of said surface, and means, actuated by the next subsequent relative movement, for slicing off the protruding substance to form a portion.

2. In a portioning machine, the combination of a dispensing container adapted to contain a quantity of the substance to be portioned and provided with a discharge opening, a surface adapted to seal said discharge opening against the protrusion of said substance, said surface being interrupted, means for providing relative movement between said container and said surface, means whereby when said surface is out of contact with said opening the contents of said container will be protruded from said container beyond the plane of said surface, means for limiting the extent of said protrusion, and means, actuated by the next subsequent relative movement, for slicing off the protruding substance to form a portion.

3. In a portioning machine, the combination of a dispensing container adapted to contain a quantity of the substance to be portioned and provided with a discharge opening, a surface adapted to seal said opening against the protrusion of said substance, said container being movable in relation to said surface and said surface being provided with an aperture in the path of said discharge opening, means whereby when said opening registers with said aperture the contents of said container will be protruded from said container beyond the plane of said surface, and means, actuated by the next subsequent relative movement, for slicing off said protruding substance to form a portion.

4. In a portioning machine, the combination of a dispensing container adapted to contain a quantity of the substance to be portioned and provided with a discharge opening, a surface adapted to seal said opening against the protrusion of said substance, said container being movable in relation to said surface and said surface being provided with an aperture in the path of said discharge opening, means whereby when said opening registers with said aperture the contents of said container will be protruded from said container beyond the plane of said surface, and means operated by the next subsequent movement of said container for slicing off said protruding substance to form a portion.

5. In a portioning machine, the combination of a dispensing container adapted to contain a quantity of the substance to be portioned and provided with a discharge opening, a surface adapted to seal said opening against the protrusion of said substance, said container being movable in relation to said surface and said surface being provided with an aperture in the path of said discharge opening, means whereby when said opening registers with said aperture the contents of said container will be protruded from said container beyond the plane of said surface, means for limiting the extent of such protrusion, and means, actuated by the next subsequent movement of said container, for slicing off the protruding substance to form a portion.

6. In a portioning machine, the combination of a dispensing container adapted to contain a quantity of the substance to be portioned and provided with a discharge opening, a surface adapted to seal said opening against the protrusion of said substance, said container being movable in relation to said surface and said surface being provided with an aperture in the path of said discharge opening, means whereby when said opening registers with said aperture the contents of said container will be protruded from said container beyond the plane of said surface, means for limiting the extent of such protrusion, and means operated by the next subsequent movement of said container for slicing off the protruding substance to form a portion.

7. In a portioning machine, the combination of a dispensing tube adapted to contain a quantity of the substance to be dispensed, the lower end of said tube being open for the discharge of its contents, a plane surface over which the discharge end of said tube is caused to move whereby said surface seals said tube against the protrusion of its contents, said surface being provided with an aperture, means whereby when the discharge end of said tube registers with said aperture the contents of said tube will be protruded from said container beyond the plane of said surface, and means, actuated by the next subsequent movement of said container, for slicing off the protruding substance to form a portion.

8. In a portioning machine, the combination of a dispensing tube adapted to contain a quantity of the substance to be dispensed, the lower end of said tube being open for the discharge of its contents, a plane surface over which the discharge end of said tube is caused to move whereby said surface seals said tube against the protrusion of its contents, said surface being provided with an aperture, means whereby when the discharge end of said tube registers with said aperture the contents of said tube will be protruded from said container beyond the plane of said surface, means for limiting such protrusion, and means, actuated by the next subsequent movement of said container, for slicing off the protruding substance to form a portion.

9. In a portioning machine, the combination of a dispensing tube adapted to contain a quantity of the substance to be dispensed, the lower end of said tube being open for the discharge of its contents, a plane surface over which the discharge end of said tube is caused to move whereby said surface seals said tube against the protrusion of its contents, said surface being provided with an aperture, means whereby when the discharge end of said tube registers with said aperture the contents of said tube will be protruded from said container beyond the plane of said surface, and means operated by the next subsequent movement of said tube for slicing off the protruding substance to form a portion.

10. In a portioning machine, the combination of a dispensing tube adapted to contain a quantity of the substance to be dispensed, the lower end of said tube being open for the discharge of its contents, a plane surface over which the discharge end of said tube is caused to move whereby said surface seals said tube against the protrusion of its contents, said surface being provided with an aperture, means whereby when the discharge end of said tube registers with said aperture the contents of said tube will be protruded from said container beyond the plane of said surface, means for limiting such protrusion, and means operated by the next subsequent movement of said tube for slicing off the protruding substance to form a portion.

11. In a portioning machine, the combination of a dispensing tube adapted to contain a quantity of the substance to be dispensed, the lower end of said tube being open for the discharge of its contents, a plane surface over which the discharge end of said tube is caused to move whereby said surface seals said tube against the protrusion of its contents, said surface being provided with an aperture, means whereby when the discharge end of said tube registers with said aperture the contents of said tube will be protruded from said container beyond the plane of said surface and a fixed knife edge intercepting the path of the protruding substance in said aperture whereby the next subsequent movement of said tube causes the protruding substance to be sliced off to form a portion.

12. In a portioning machine, the combination of a dispensing tube adapted to contain a quantity of the substance to be dispensed, the lower end of said tube being open for the discharge of its contents, a plane surface over which the discharge end of said tube is caused to move whereby said surface seals said tube against the protrusion of its contents, said surface being provided with an aperture, means whereby when the discharge end of said tube registers with said aperture the contents of said tube will be protruded from said container beyond the plane of said surface, means for limiting the protrusion of said substance in said aperture, and a fixed knife edge intercepting the path of the protruding substance whereby the next subsequent movement of said tube causes the protruding substance to be sliced off to form a portion.

13. In a portioning machine, the combination of a plurality of dispensing containers adapted to contain quantities of the substance to be portioned and mounted to move in unison, each of said containers being provided with a discharge opening, a plane surface in contact with which said openings travel during the movement of said containers whereby said openings are sealed against the protrusion of said substance from said containers, said surface being provided with an aperture in the path of said discharge openings, means whereby when a discharge opening registers with said aperture the contents of the corresponding container is protruded through said aperture, and means operated by the next subsequent movement of said container for slicing off the protruding substance to form a portion.

14. In a portioning machine, the combination of a plurality of dispensing containers adapted to contain quantities of the substances to be portioned and mounted to move in unison, each of said containers being provided with a discharge opening, a plane surface in contact with which said openings travel during the movement of said containers whereby said openings are sealed against the protrusion of said substance from said containers, said surface being provided with an aperture in the path of said discharge openings, means whereby when a discharge opening registers with said aperture the contents of the corresponding container is protruded through said aperture, means for limiting said protrusion, and means operated by the next subsequent movement of said container for slicing off the protruding substance to form a portion.

15. In a portioning machine, the combination of a plurality of dispensing containers adapted to contain quantities of the substance to be portioned and mounted to move in unison, each of said containers being provided with a discharge opening, a plane surface in contact with which said openings travel during the movement of said containers whereby said openings are sealed against the protrusion of said substance from said containers, said surface being provided with an aperture in the path of said discharge openings, means whereby when a discharge opening registers with said aperture the contents of the corresponding container is protruded through said aperture, and a knife edge intercepting the path of the protruding substance whereby the next subsequent movement of said container causes the protruding substance to be sliced off to form a portion.

16. In a portioning machine, the combination of a plurality of dispensing containers adapted to contain quantities of the substance to be portioned and mounted to move in unison, each of said containers being provided with a discharge opening, a plane surface in contact with which said openings travel during the movement of said containers whereby said openings are sealed against the protrusion of said substance from said containers, said surface being provided with an aperture in the path of said discharge openings, means whereby when a discharge opening registers with said aperture the contents of the corresponding container is protruded through said aperture, means for limiting such protrusion, and a knife edge intercepting the path of the protruding substance whereby the next subsequent movement of said container causes the protruding substance to be sliced off to form a portion.

17. In a portioning machine, the combination of a plurality of dispensing tubes adapted to contain quantities of the substance to be portioned, said tubes being mounted to move in unison, a plane surface over which the discharge ends of said tubes travel whereby said tubes are sealed against the discharge of their contents, said surface being provided with an aperture in the path of said discharge ends, means whereby when the discharge end of a tube registers with said aperture the contents of said tube is caused to protrude through said aperture, and means operated by the next subsequent movement of said tube for slicing off said protruding substance to form a portion.

18. In a portioning machine, the combination of a plurality of dispensing tubes adapted to contain quantities of the substance to be portioned, said tubes being mounted to move in unison, a plane surface over which the discharge ends of said tubes travel whereby said tubes are sealed against the discharge of their contents, said surface being provided with an aperture in the path of said discharge ends, means whereby when the discharge end of a tube registers with said aperture the contents of said tube is caused to protrude through said aperture, means for limiting the protrusion of said substance, and means operated by the next subsequent movement of said tube for slicing off the protruding substance to form a portion.

19. In a portioning machine, the combination of a plurality of dispensing tubes adapted to contain quantities of the substance to be portioned, said tubes being mounted to move in unison, a plane surface over which the discharge ends of said tubes travel whereby said tubes are sealed against the discharge of their contents, said surface being provided with an aperture in the path of said discharge ends, means whereby when the discharge end of a tube registers with said aperture the contents of said tube is caused to protrude through said aperture, and a knife edge intercepting the path of the protruding substance whereby the next subsequent movement of said tube causes the protruding substance to be sliced off to form a portion.

20. In a portioning machine, the combination of a plurality of dispensing tubes adapted to contain quantities of the substance to be portioned, said tubes being mounted to move in unison, a plane surface over which the discharge ends of said tubes travel whereby said tubes are sealed against the discharge of their contents, said surface being provided with an aperture in the path of said discharge ends, means whereby when the discharge end of a tube registers with said aperture the contents of said tube is caused to protrude through said aperture, means for limiting the protrusion of said tube, and a knife edge intercepting the path of the protruding substance whereby the next subsequent movement of said tube causes the protruding substance to be sliced off to form a portion.

21. In a portioning machine, the combination of a plurality of dispensing tubes mounted to be rotated in unison about a common center, and each adapted to contain a slab of the substance to be portioned, a plane surface over which the discharge ends of said tubes travel whereby said tubes are sealed against the discharge of their contents, said surface being provided with an aperture, means whereby when the discharge end of a tube registers with said aperture the end of the slab contained in said tube is caused to protrude through said aperture, and means operated by the next subsequent movement of said tube for slicing off the protruding end of the slab to form a portion.

22. In a portioning machine, the combination of a plurality of dispensing tubes mounted to be rotated in unison about a common center, and each adapted to contain a slab of the substance to be portioned, a plane surface over which the discharge ends of said tubes travel whereby said tubes are sealed against the discharge of their contents, said surface being provided with an aperture, means whereby when the discharge end of a tube registers with said aperture the end of the slab contained in said tube is caused to protrude through said aperture, means for limiting said protrusion to determine the thickness of the portion, and means operated by the next subsequent movement of said tube for slicing off the protruding end of the slab to sever the portion.

23. In a portioning machine, the combination of a plurality of dispensing tubes mounted to be rotated in unison about a common center, and each adapted to contain a slab of the substance to be portioned, a plane surface over which the discharge ends of said tubes travel whereby said tubes are sealed against the discharge of their contents, said surface being provided with an aperture, means whereby when the discharge end of a tube registers with said aperture the end of the slab contained in said tube is caused to protrude through said aperture, and a knife edge in the plane of said surface intercepting the path of said protruding end whereby the next subsequent movement of the tube causes said protruding end to be sliced off to form a portion.

24. In a portioning machine, the combination of a plurality of dispensing tubes mounted to be rotated in unison about a common center, and each adapted to contain a slab of the substance to be portioned, a plane surface over which the discharge ends of said tubes travel whereby said tubes are sealed against the discharge of their contents, said surface being provided with an aperture, means whereby when the discharge end of a tube registers with said aperture the end of the slab contained in said tube is caused to protrude through said aperture, means for limiting said protrusion to determine the thickness of the portion, and a knife edge in the plane of said surface intercepting the path of the protruding end whereby the next subsequent movement of the tube causes the protruding end of the slab to be sliced off to form the portion.

25. In a portioning machine, a plurality of dispensing tubes mounted to rotate in unison about a common center, and each adapted to contain a slab of the product to be dispensed, a plane surface over which the discharge ends of said tubes travel whereby said tubes are sealed against the discharge of their contents, said surface being provided with an aperture in the path of said discharge ends, means whereby when the discharge end of a tube registers with said aperture, its slab drops down so that the end of said slab protrudes through said aperture, means adjacent to the front end of said aperture to limit the descent of said slab, and a knife edge intercepting the path of the protruding slab whereby during the next subsequent movement of said tubes the protruding end of said slab is sliced off to form a portion.

26. In a portioning machine, a plurality of dispensing tubes mounted to rotate in unison about a common center, and each adapted to contain a slab of the product to be dispensed, a plane surface over which the discharge ends of said tubes travel whereby said tubes are sealed against the discharge of their contents, said surface being provided with an aperture in the path of said discharge ends, means whereby when the discharge end of a tube registers with said aperture, its slab drops down so that the end of said slab protrudes through said aperture, a spacing shelf adjacent to the front end of said aperture to limit the descent of the slab, and a knife edge intercepting the path of the protrudng slab whereby during the next subsequent movement of said tubes, said cutting edge is caused to slice through the protruding end of the slab to form a portion.

27. In a portioning machine, a plurality of dispensing tubes mounted to rotate in unison about a common center, and each adapted to contain a slab of the product to be dispensed, a plane surface over which the discharge ends of said tubes travel whereby said tubes are sealed against the discharge of their contents, said surface being provided with an aperture, in the path of said discharge ends, means whereby when the discharge end of a tube registers with said aperture, its slab drops down so that the end of said slab protrudes through said aperture, means operated by the next subsequent movement of said tubes for slicing off the protruding end of said slab to form a portion, and means for rotating said tubes intermittently in the proper direction.

28. In a portioning machine, a plurality of dispensing tubes mounted to rotate in unison about a common center, and each adapted to contain a slab of the product to be dispensed, a plane surface over which the discharge ends of said tubes travel whereby said tubes are sealed against the discharge of their contents, said surface being provided with an aperture in the path of said discharge ends, whereby when the discharge end of a tube registers with said aperture, its slab drops down, means operated by the movement of said tubes for slicing off the protruding end of said slab to form a portion, means for rotating said tubes intermittently in the proper direction, and means for preventing the reverse rotation of said tubes.

29. In a portioning machine, a plurality of dispensing tubes mounted to rotate in unison about a common center, and each adapted to contain a slab of the product to be dispensed, a plane surface over which the discharge ends of said tubes travel whereby said tubes are sealed against the discharge of their contents, said surface being provided with an aperture in the path of said discharge ends, whereby when the discharge end of a tube registers with said aperture, its slab drops down, means adjacent to the front end of said aperture to limit the descent of said slab, a knife edge intercepting the path of the protruding slab whereby during the next movement of said tubes the protruding end of said slab is sliced off to form a portion, means for rotating said tubes intermittently in the proper direction, and means whereby a rotary movement imparted to said tubes must be completed before a subsequent rotary movement can be begun.

30. In a portioning machine, a plurality of dispensing tubes mounted to rotate in unison about a common center, and each adapted to contain a slab of the product to be dispensed, a plane surface over which the discharge ends of said tubes travel whereby said tubes are sealed against the discharge of their contents, said surface being provided with an aperture in the path of said discharge ends whereby when the discharge end of a tube registers with said aperture, its slab drops down, means adjacent to the front end of said aperture to limit the descent of said slab, a knife edge intercepting the path of the protruding slab whereby during the next movement of said tubes the protruding end of the slab is sliced off to form a portion, means for rotating said tubes intermittently in the proper direction, and means for preventing the reverse rotation of said tubes.

31. In a portioning machine, the combination of a plurality of dispensing containers, each adapted to contain a quantity of the substance to be portioned and each provided with a discharge opening, a plane surface, means for moving said containers in unison in contact with said plane surface whereby said discharge openings are sealed against the protrusion of the contents of said containers, said surface being provided with an aperture, means whereby when one of said discharge openings registers with said aperture the contents of said container is protruded through said aperture, and a knife edge intercepting the path of said protruding substance, whereby the next subsequent movement of said container causes said protruding substance to be sliced off to form a portion while the container resumes contact with said plane surface to hold the remainder of its contents retracted within said container.

32. In a portioning machine, the combination of a plurality of dispensing containers, each adopted to contain a quantity of the substance to be portioned and each provided with a discharge opening, a plane surface, means for moving said containers in unison in contact with said plane surface whereby said discharge openings are sealed against the protrusion of the contents of said containers, said surface being provided with an aperture, means whereby when one of said discharge openings register with said aperture the contents of said container is protruded through said aperture, means for limiting such protrusion, and a knife edge intercepting the path of said protruding substance whereby the next subsequent movement of said container causes said protruding substance to be sliced off to form a portion while the container resumes contact with said plane surface to hold the remainder of its contents retracted within said container.

33. In a portioning machine the combination of an outer casing having a horizontal plane surface, a refrigerant tank rotatably mounted in said casing, a plurality of dispensing tubes mounted in a vertical position about said tank and having their lower ends sealed by said plane surface, said plane surface being provided with an aperture in the path of said tubes, means whereby when one of said tubes is brought into registration with said aperture by the rotation of said tank, the slab of substance to be dispensed contained in said tube drops down so that its end protrudes through said aperture, means for limiting the protrusion of said slab, and means operated by the further next subsequent movement of said tank whereby the protruding end of said slab is sliced off to form a portion while the lower end of said tube containing the shortened butt of said slab passes once more into sealing contact with said plane surface.

34. In a portioning machine, the combination of an outer casing having a horizontal plane surface, a refrigerant tank rotatably mounted in said casing, a plurality of dispensing tubes mounted in a vertical position about said tank and having their lower ends sealed by said plane surface, said plane surface being provided with an aperture in the path of said tubes, means whereby when one of said tubes is brought into registration with said aperture by the rotation of said tank, the slab of substance to be dispensed contained in said tubes drops down so that its end protrudes through said aperture, means for limiting the protrusion of said slab, and a knife edge intercepting the path of the protruding end of said slab whereby the next subsequent movement of said tank causes said knife edge to sever said protruding end to form a portion while the lower end of said tube containing the shortened butt of said slab passes into sealing contact with said plane surface once more.

Signed at Pittsburgh, Pa., this 22nd day of November, 1919.

JOHN F. WINELAND.